United States Patent [19]

Dantzig et al.

[11] 4,225,544

[45] Sep. 30, 1980

[54] METHOD FOR FABRICATING A SPARGER PLATE FOR USE IN DEGASSING OF MOLTEN METAL

[75] Inventors: Jonathan A. Dantzig, New Haven; Derek E. Tyler, Cheshire; Richard C. Milici, Madison, all of Conn.

[73] Assignee: Swiss Aluminium Ltd., Chippis, Switzerland

[21] Appl. No.: 33,792

[22] Filed: Apr. 25, 1979

Related U.S. Application Data

[62] Division of Ser. No. 874,867, Feb. 3, 1978, Pat. No. 4,166,604.

[51] Int. Cl.³ ......................... B29H 7/20; C04B 35/64

[52] U.S. Cl. ......................................... 264/43; 264/44; 264/57; 264/59

[58] Field of Search ....................... 264/43, 44, 42, 56, 264/59, 57

[56] References Cited

U.S. PATENT DOCUMENTS

| | | | |
|---|---|---|---|
| 2,127,867 | 8/1938 | Harvey | 264/56 |
| 3,377,225 | 4/1968 | Munters | 264/43 |
| 3,533,753 | 10/1970 | Berger | 264/44 |
| 3,539,667 | 11/1970 | Nameishi | 264/56 |
| 3,758,652 | 9/1973 | Jebens | 264/43 |

*Primary Examiner*—Donald J. Arnold

*Attorney, Agent, or Firm*—Bachman and LaPointe

[57] ABSTRACT

An improved method for fabricating a ceramic sparger plate for use in the degassing of molten metal is disclosed in which a castable ceramic is poured into a mold which contains an array of vertically disposed strands which are removed subsequent to the ceramic curing and prior to firing of the ceramic thus leaving the desired pattern of holes through which the fluxing gas is introduced into the molten metal.

3 Claims, 4 Drawing Figures

METHOD FOR FABRICATING A SPARGER PLATE FOR USE IN DEGASSING OF MOLTEN METAL

This is a division of application Ser. No. 874,867, filed Feb. 3, 1978 now U.S. Pat. No. 4,166,604.

BACKGROUND OF THE INVENTION

The present invention relates to a method of fabricating a sparger plate with a desired array of fine holes of controlled size and spacing for use in the degassing of molten metal.

Molten metal, particularly molten aluminum in practice, generally contains entrained and dissolved impurities both gaseous and solid which are deleterious to the final cast product. These impurities may affect the final cast product after the molten metal is solidified whereby processing may be hampered or the final product may be less ductile or have poor finishing and anodizing characteristics. The impurities may originate from several sources. For example, the impurities may include metallic impurities such as alkaline and alkaline earth metals and dissolved hydrogen gas and occluded surface oxide films which have become broken up and are entrained in the molten metal. In addition, inclusions may originate as insoluble impurities such as carbides, borides and others or eroded furnace and trough refractories.

One process for removing gaseous impurities from molten metals is by degassing. The physical process involves injecting a fluxing gas into the melt. The hydrogen enters the purge gas bubbles by diffusion through the melt to the bubble where it adheres to the bubble surface and is adsorbed into the bubble itself. The hydrogen is then carried out of the melt by the bubble.

It is naturally highly desirable to improve the degassing of molten metals in order to remove or minimize such impurities in the final cast product, particularly with respect to molten aluminum and especially, for example, when the resultant metal is to be used in a decorative product such as a decorative trim or products bearing critical specifications such as aircraft forgings and extrusions and light gauge foil stock. Impurities as aforesaid cause loss of properties such as tensile strength and corrosion resistance in the final cast product.

Rigorous metal treatment processes such as gas fluxing or melt filtration have minimized the occurrence of such defects. However, while such treatments have generally been successful in reducing the occurrence of such defects to satisfactory levels, they have been found to be inefficient and/or uneconomical. Conventionally conducted gas fluxing processes such as general hearth fluxing have involved the introduction of the fluxing gas to a holding furnace containing a quantity of molten metal. This procedure requires that the molten metal be held in the furnace for significant time while the fluxing gas is circulated so that the metal being treated would remain constant and treatment could take place. This procedure has many drawbacks, among them, the reduced efficiency and increased cost resulting from the prolonged idleness of the furnace during the fluxing operation. Further factors comprise the restriction of location to the furnace which permits the re-entry of impurities to the melt before casting, and the high emissions resulting from both the sheer quantity of flux required and the location of its circulation.

As an alternative to the batch-type fluxing operations employed as aforesaid, certain fluxing operations were employed in an inline manner; that is, the operation and associated apparatus were located outside the melting or holding furnace and often between the melting furnace and either the holding furnace or the holding furnace and the casting station. This helped to alleviate the inefficiency and high cost resulting from furnace idleness when batch fluxing but was not successful in improving the efficiency of the degassing operation itself, in that the large size of the units and the undesirably large quantities of fluxing gas required per unit of molten metal were both costly and detrimental to air purity.

A typical inline gas fluxing technique is disclosed in U.S. Pat. No. 3,737,304. In the aforenoted patent, a bed of "stones" is positioned in a housing through which the molten metal will pass. A fluxing gas is introduced beneath the bed and flows up through the spaces between the stones in counter flow relationship with the molten metal. The use of a bed of porous "stones" has an inherent disadvantage. The fact that the stones have their pores so close together results in the bubbles passing through the stones coalescing on their surfaces and thus creating a relatively small number of large bubbles rather than a large number of small bubbles. The net effect of the bubbles coalescing is to reduce the surface area of bubble onto which the hydrogen can be adsorbed thus resulting in low degassing efficiency.

Accordingly, it is the principal object of the present invention to provide an improved sparger plate for use in degassing of molten metal.

It is a particular object of the present invention to provide an improved method for fabricating a sparger plate for controlling the introduction and dispersion of fine fluxing gas bubbles into a molten metal.

Further objects and advantages of the present invention will be evident from what appears hereinbelow.

SUMMARY OF THE INVENTION

In accordance with the present invention, the foregoing objects and advantages are readily attained.

The present invention comprises a highly efficient degassing apparatus comprising a chamber having respective metal inlets and outlets, side walls and a floor. The chamber is divided by a baffle into two parts. Molten metal is caused to flow from the inlet to the first part of the chamber under the baffle to the second part of the chamber and out the respective outlet. A sparger plate is provided in the floor of the chamber to introduce a fluxing gas into the molten metal as it passes through the first part of the chamber prior to passing under the baffle into the second part of the chamber. In the preferred embodiment, the sparger plate is designed in such a manner as to maximize the surface area and dispersion of the degassing bubbles for the adsorption of gaseous impurities. The sparger plate provides a plurality of orifices for introducing the fluxing gas into the molten metal. The mean difference between the orifices and the orifice size should be controlled so as to minimize the diffusion distance for the gaseous impurities while being sufficiently large to prevent bubble coalescence.

The degassing of molten metal is conducted by passing the molten metal through a chamber wherein the metal is brought into countercurrent contact with a fluxing gas while within a first part of the chamber, said fluxing gas, having issued from a sparger plate located within the first part of said chamber, percolates up into contact with the molten metal within the first part of the chamber.

The degassing may employ a fluxing gas such as an inert gas, preferably carrying a small quantity of an active gaseous ingredient such as chlorine or a fully halogenated carbon compound. The gas used may be any of the gases or mixtures of gases such as nitrogen, argon, chlorine, carbon monoxide, Freon 12, etc., that are known to give acceptable degassing. In the preferred embodiment for the degassing of molten aluminum melts, mixtures of nitrogen-Freon 12 or argon-Freon 12 are preferred. In addition, a supernatant salt cover comprised of alkaline and alkaline earth chlorides and a fluoride may be located on the surface of the melt to aid in the degassing process by minimizing the readsorption of gaseous impurities at the surface of the melt. Typical salts employed may be molten halides such as sodium chloride, potassium chloride, magnesium chloride, or mixtures thereof and should be selected to minimize erosion of the refractory lining of the degassing chamber. Alternatively, gaseous covers such as argon, nitrogen, etc., may be used as a protective cover over the molten metal to minimize the readsorption of gaseous impurities at the surface of the melt.

The employment of the sparger plate of the present invention in the above apparatus minimizes the bubble size of the purged gas while maximizing the gas bubble density thereby increasing the effective surface area for carrying out the adsorption reaction thus optimizing the degassing of the molten metal.

In accordance with the method of the present invention, the sparger plate is fabricated by a technique which consists of pouring a castable ceramic into a mold which contains an array of vertically disposed strands. The ceramic is allowed to cure in the mold and the strands are subsequently withdrawn. The cured ceramic is then fired thus leaving a desired pattern of holes through which the fluxing gas emanates into the molten metal.

DETAILED DESCRIPTION

Figure 1:
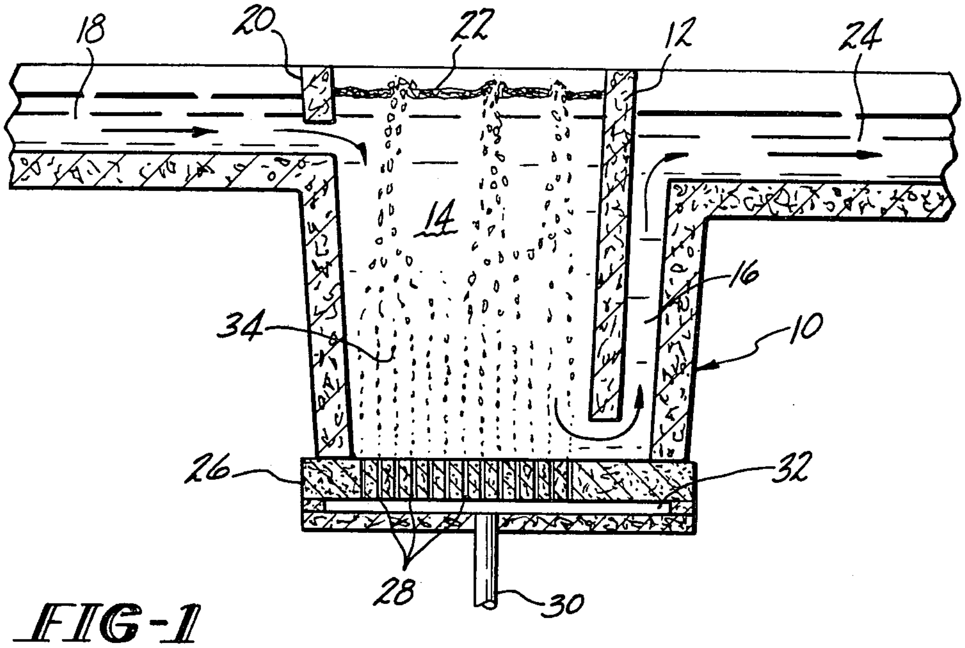
FIG. 1 is a schematic sectional view of a filtering trough in which the sparger plate fabricated by the method of the present invention is utilized.
Figure 2:
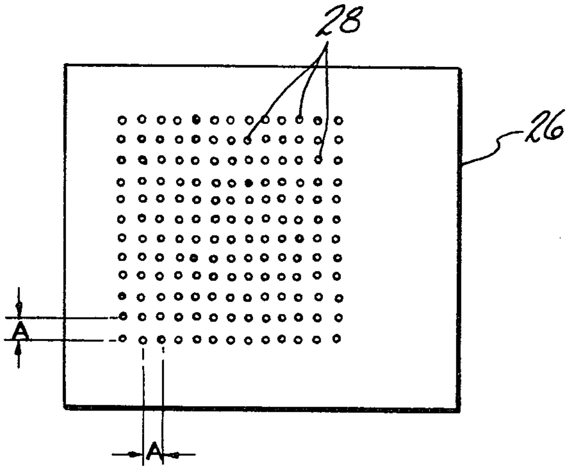
FIG. 2 is a top view of a sparger plate employed in the apparatus of FIG. 1.

Referring to FIG. 1, an apparatus is illustrated in location with a molten metal transfer system which may include pouring pans, pouring troughs, transfer troughs, filtering troughs, metal treatment bays or the like. The apparatus and method of the present invention may be employed in a wide variety of locations occurring intermediate the melting and casting stations in the metal processing system. Thus, FIG. 1 illustrates a refractory fluxing box 10 which is divided by a baffle wall 12 into chambers 14 and 16. The molten metal enters chamber 14 through inlet launder 18 under a second baffle 20 which serves to confine a molten salt layer 22 on the surface of the metal in chamber 14 and prevent it from flowing backwards along the launder 18. The molten metal passes through chamber 14 under baffle 12 into chamber 16 and down outlet launder 24 for further processing.

The floor of the fluxing box consists of a cast ceramic sparger plate 26 having a plurality of orifices 28 for introducing a fluxing gas from the inlet 30 and plenum chamber 32 into the molten metal as it passes through chamber 14.

The fluxing gas which may be employed with the sparger plate comprises a wide variety of well known components including chlorine gas and other halogenated gaseous material, carbon monoxide as well as certain inert gas mixtures derived from and including nitrogen, argon, helium and the like. A preferred gas mixture for use in the present invention for degassing molten aluminum and aluminum alloys comprises a mixture of nitrogen or argon with dichlorodifluoromethane from about 2 to about 20% by volume, preferably 5 to 15% by volume. In conjunction with this gas mixture, a molten salt mixture 22 may be employed on the surface of the melt residing within chamber 14 which would comprise halides such as sodium chloride, potassium chloride, magnesium chloride or mixtures thereof. It should be noted that the molten salt mixture should be selected to minimize erosion of the refractory lining of the fluxing box. In addition, a gaseous protective cover of argon, nitrogen or the like may be used over the molten metal so as to minimize readsorption of gaseous impurities at the surface of the melt in the same manner as the molten salt. The above-noted and foregoing compositions are presented for purposes of illustration only and do not form a material limitation on the present invention.

Referring to FIG. 1, molten metal is delivered to the refractory box 10 which is divided into chambers 14 and 16 by baffle wall 12. The molten metal is introduced into chamber 14 by an inlet launder 18 under baffle wall 20. As the molten metal passes through chamber 14 under baffle wall 12 into chamber 16, the molten metal is brought into countercurrent flow with a fluxing gas, depicted as a plurality of bubbles 34, which is introduced into chamber 14 via gas inlet 13, plenum chamber 32 and a plurality of orifices 28 in cast ceramic sparger plate 26. A molten salt cover 22 may be provided on the surface of the melt as previously noted so as to minimize the readsorption of gaseous impurities into the melt. As the fluxing gas passes through the melt in countercurrent flow with the melt, the gaseous impurities diffuse through the melt, adhere to the fluxing gas bubble, is adsorbed into the bubble itself and is subsequently carried up to the surface as the bubble percolates up through the melt thereby removing said impurities.

The use of a cast ceramic sparger plate fabricated by the method of the present invention has a distinct advantage over conventional methods and apparatuses for introducing fluxing gas into a molten metal. The method of the present invention allows for the fabrication of a sparger plate in which orifice size and spacing may be readily controlled so as to eliminate the bubble coalescence which is inherent in previously known degassing units.

Figure 3:
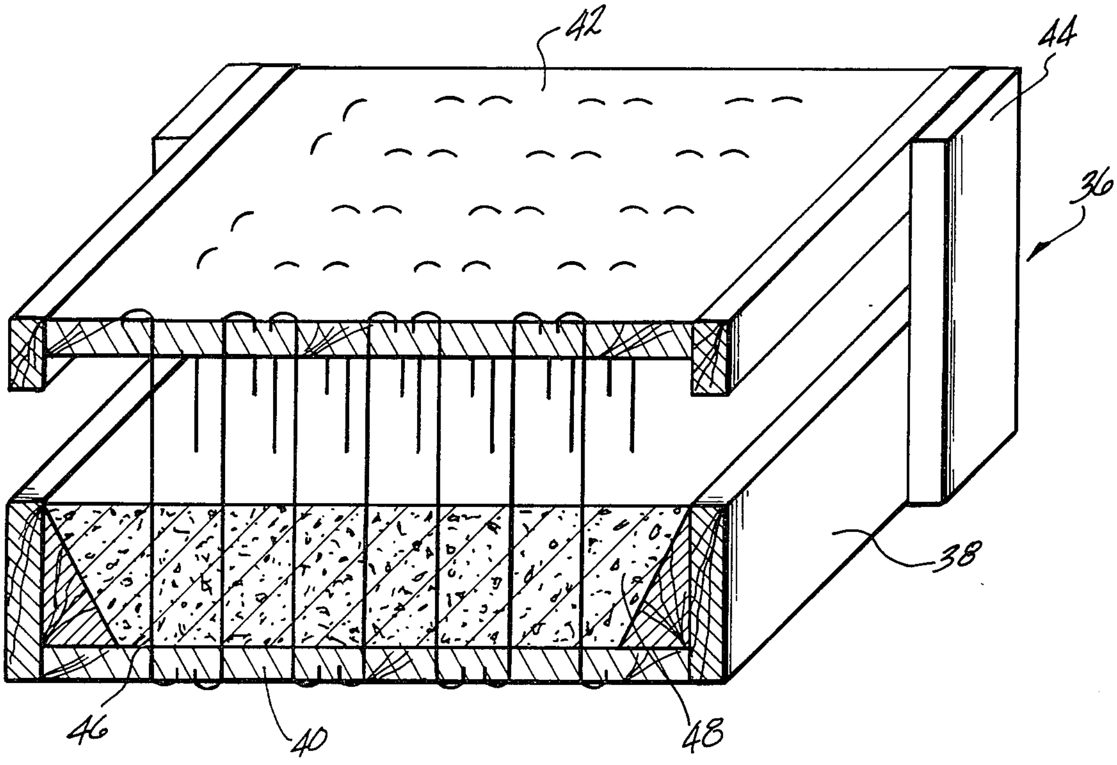
FIG. 3 is a schematic representing one embodiment of the method of the present invention.
Figure 4:
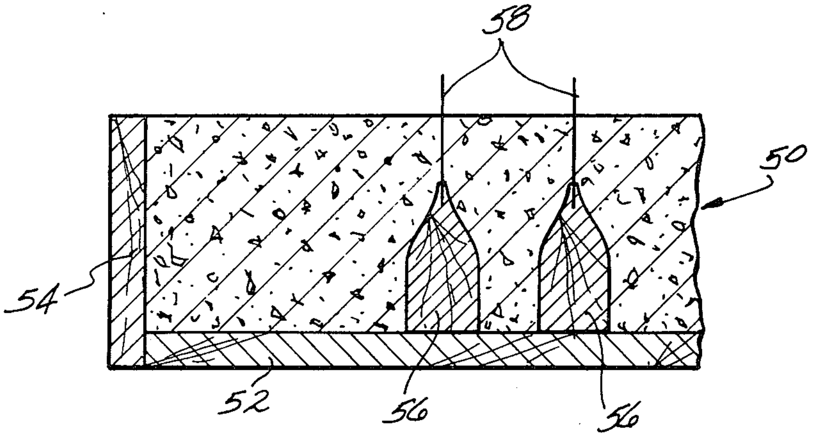
FIG. 4 is a schematic representing a second embodiment of the method of the present invention.

FIG. 3 is a sectional view of a wooden frame or mold 36 used in fabricating a sparger plate in accordance with one embodiment of the method of the present invention. The wooden frame 36 consists of side walls 38, base 40 and top plate 42. The top plate 42 may be secured to the side walls 38 in any suitable manner such as by bracket 44. The base 40 is provided with an array of orifices. Top plate 42 is also provided with an array of orifices which are formed as a mirror image of those orifices provided in the base. Thus, an imaginary connecting line between an orifice in the base and the corresponding mirror image orifice in the top plate lies in a vertical plane with respect to both the base and top plate. A plurality of wire strands 46 are inserted and secured to the orifices in the base 40 and the corresponding mirror image orifice in the top plate 42 as illustrated in FIG. 3. In accordance with the present invention, the diameter of the wire strands 46 and the distance which separate the same are selected so as to minimize bubble size and coalescence. An alternate mold for use with the method of the present invention is illustrated in FIG. 4. The mold 50 consists of base 52 and side walls 54. An array of wood or wax cores 56 are provided on the base 52 and are adapted to receive wire strands 58 which lie in a vertical plane with respect to the wood base 52. In accordance with the method of the present invention, a castable ceramic material 48 such as a high alumina refractory is poured into the wooden frame where it is allowed to cure. Subsequent to curing and prior to the firing of the ceramic, the wire strands are withdrawn thus leaving the desired pattern of holes for fluxing gas dispersion.

The dimensions of the sparger plate depend greatly upon the flow rate of the metal to be treated and the fluxing gas box dimensions. For typical commercial aluminum flow rates of up to 2,000 pounds per minute, the fluxing gas box unit will have a cross sectional dimension of less than 4' square and thus will be very compact and suitable for incorporation into existing transfer systems.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An improved method for manufacturing a sparger plate for use in the degassing of molten metal, comprising:

providing a mold means consisting of at least a base means and side wall means;

securing to said base means an array of strand receiving cores of controlled spacing for receiving strand means in a plane vertical to said base means;

locating said strand means of controlled size in said strand receiving cores;

pouring a castable ceramic into said mold means;

allowing said castable ceramic to cure;

removing said strand means from said strand receiving cores; and firing said cured ceramic so as to develop a cast ceramic sparger plate characterized by an array of holes of controlled size and spacing.

2. A method according to claim 1 wherein said array of strand receiving cores consists of a plurality of wood cores secured to said base means.

3. A method according to claim 1 wherein said array of strand receiving cores consists of a plurality of wax cores secured to said base means.

* * * * *